United States Patent [19]

Lerma

[11] Patent Number: 4,989,497
[45] Date of Patent: Feb. 5, 1991

[54] FLEXIBLE DIAPHRAGM-EXTREME TEMPERATURE USAGE

[75] Inventor: Guillermo Lerma, Fountain Valley, Calif.

[73] Assignee: The United States of America as represented by the Administrator of the National Aeronautics and Space Administration, Washington, D.C.

[21] Appl. No.: 41,389

[22] Filed: Apr. 23, 1987

Related U.S. Application Data

[62] Division of Ser. No. 771,537, Aug. 30, 1985, Pat. No. 4,676,853.

[51] Int. Cl.$^5$ .............................................. F01B 19/00
[52] U.S. Cl. .............................. 92/103 SD; 92/103 F
[58] Field of Search .................. 428/477; 92/103 SD, 92/103 F; 156/81, 285–286, 289, 298, 307.1, 381, 307.3, 382, 307.1, 389; 264/316, 510, 552.4, 571, 338, 86–87; 425/389, 19, 512

[56] References Cited

U.S. PATENT DOCUMENTS 3,026,909  3/1962  Boteler ................................. 137/793
4,022,114  5/1977  Hansen, III ........................ 92/103 F
4,246,313  1/1981  Stengle, Jr. ......................... 156/280

Primary Examiner—Merrell C. Cashion, Jr.
Attorney, Agent, or Firm—Hardie R. Barr; John R. Manning; Edward K. Fein

[57] ABSTRACT

A diaphragm (10) suitable for extreme temperature usage, such as encountered in critical aerospace applications, is fabricated by a unique method, and of a unique combination of materials, which include multi-layered lay-ups of diaphragm materials (20a, 22, 20b) sandwiched between layers of bleeder fabric (29, 36), which, after being formed in the desired shape on a mold (26), are vacuum sealed (38) and then cured under pressure, in a heated autoclave, to produce a bond capable of withstanding extreme temperatures.

10 Claims, 2 Drawing Sheets

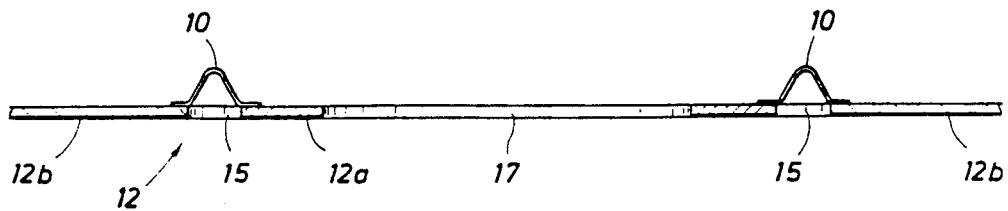
FIG. 1
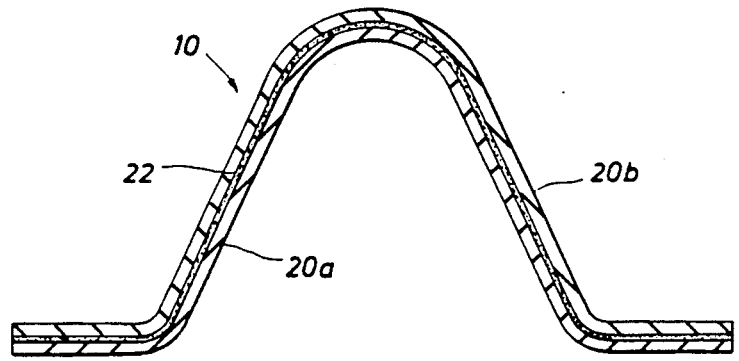
FIG. 2
FIG. 3
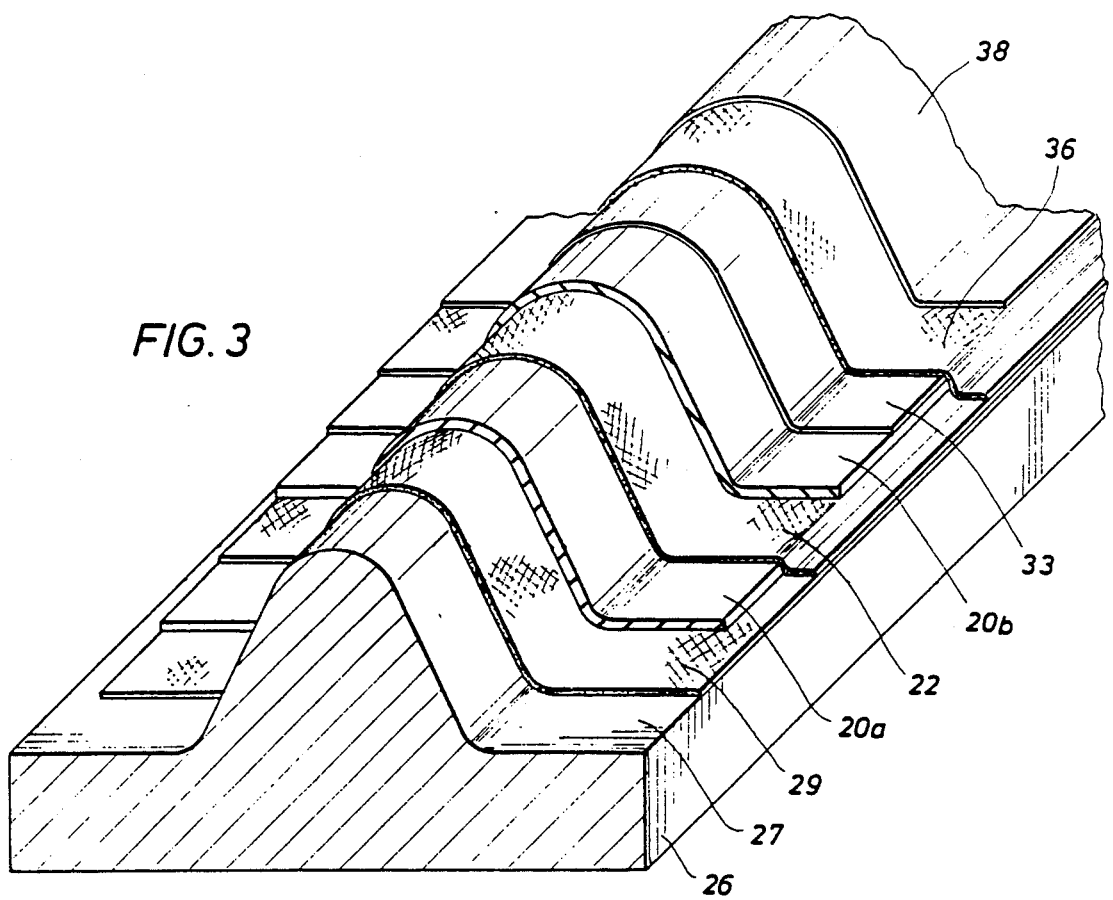

FLEXIBLE DIAPHRAGM-EXTREME TEMPERATURE USAGE

ORIGIN OF THE INVENTION

This is a division of U.S. patent application Ser. No. 771,537, filed Aug. 30, 1985, now U.S. Pat. No. 4,676,853.

The invention described herein was made in the performance of work under a NASA contract and is subject to the provision of Section 305 of the National Aeronautics and Space Act of 1958, Public Law 85-568 (72 Stat. 435; 42 U.S.C. 2457).

BACKGROUND OF THE INVENTION

The present invention relates to flexible membranes, and more particularly to a flexible diaphragm seal assembly suitable for use in extreme temperature ranges.

Flexible diaphragms used as seals, as pressure transducers, as barriers for separating differing media, and so forth, are well known. Numerous examples may be found in the technical literature, in industrial applications, and of course in nature itself. The man-made diaphragm configurations and methods for their fabrication are as varied as the applications to which they are put.

However, although there are many diaphragms designed for rigorous environments, none could be found which was suitable for certain especially demanding aerospace applications. For example, in the Shuttle Orbiter there is a need for a diaphragm seal capable of operating at temperature extremes ranging from −200° F. to +600° F., and capable of withstanding physical excursions imposed at these temperatures by induced motions during the Shuttle engine ignition, ascent, and External Tank and Orbiter separation. In one instance, these motions require a diaphragm capable of deflecting 0.5 inch in all directions while subjected to −150° F. ±10° F., and while containing an inert gaseous purge. The leakage is not to exceed 10.4 SCFM @ 3.26 PSI, 18.8 SCFM @ −2.76 PSI. After external tank, Orbiter separation, the diaphragm then has to provide a seal between the aft fuselage area and outer space. The gaseous purge requirement (as with an inert gas to prevent explosive risks) means that the diaphragm seal must be capable of maintaining a positive pressure during such maneuvers. After separation in outer space, these pressure conditions then reverse. No known material or combination of materials could be found which was capable of operating in these extreme conditions.

Finding the prior art wanting, various configurations, such as silicon rubber coated aramid, teflon, aluminum foil, and glass fabric composite sandwich diaphragms, were constructed and tested in attempts to meet these stringent requirements. They all failed during cryogenic flexing tests.

That the literature fails to disclose or suggest configurations suitable for such extreme conditions may be seen from the following examples. U.S. Pat. No. 2,929,655 (Dwyer, issued Jan. 12, 1960), for instance, discloses a diaphragm made of a fibrous base layer (for example, glass cloth) having flexible metal foil on one or both faces thereof. It is intended for above normal operating temperatures (not cryogenic)—the metal being described, inter alia, as having to have a melting point higher than that to which it would be subjected in use. Due to brittleness of metal at low temperatures it is doubtful whether such a diaphragm would be suitable for low temperature extremes.

U.S. Pat. No. 3,026,909 (Boteler, issued Mar. 27, 1962) discloses a stud-containing diaphragm for use in diaphragm valves. The diaphragm is reinforced to provide high pull-out strength for the stud, and is cured by conventional compression molding at an elevated temperature in a hydraulic press, as distinguished from the vacuum autoclave pressure molding taught further herein by the present invention.

U.S. Pat. No. 4,022,114 (Hansen, III et al., issued May 10, 1977) is directed to diaphragms for use in regulators for handling refrigerant media passing from an evaporator to a compressor. With regard to the disclosed diaphragms, it teaches that "Total and complete bonding . . . is never possible" (column 1, lines 21-23), and that "voids, however small, between the bonded surfaces are inevitable." (Column 1, lines 23-24.) In fact, it states that ". . . no degree of care can prevent the existence of voids or weakened places in the bonded interface of the laminates." (Column 1, lines 34-37.) Several structures are therefore disclosed, depending upon the intended application. These include a fiberglass reinforcing layer bonded to elastomer sealing layers, which may be silicone rubber. It seeks to solve the problem of imperfect bonding by perforating the elastomer to vent any gas trapped in voids between the layers. Sometimes the perforations are only partial. In some embodiments the bonding of the elastomer to the fabric is intentionally only partial. Some have fabric or elastomer on one side (surface) only.

A two-sided silicone rubber coated glass fabric configuration, produced by liquid silicone rubber processing, such as supported extrusions, is disclosed in Elastomerics, 112, Feb. 1980, pp. 17-20 (W. R. Hays). Unfortunately, tests of this structure for use as an aerospace diaphragm (using aramide fabric reinforcement rather than glass fabric) found that the diaphragm cracked and leaked in several places during initial chill down to −150° F. ±10° F., prior to the initiation of testing. Retesting (of the same configuration and material, but with material from a different supplier) resulted in the same failure. As presently understood, this failure is believed to have resulted from the necessity to thin the liquid rubber so that it could impregnate into the weave or knit of the fabric. Such thinning lowers the molecular weight consistency, thereby reducing the rubber film strength.

A substantial need therefore remains for a flexible diaphragm suitable for extreme temperature usage, and particularly one which can meet the rigorous aerospace applications described above. Ideally, such a diaphragm construction, and its method of fabrication, will be not only durable (and thus suitable for multiple aerospace mission use), but will also be uncomplicated, versatile, and relatively inexpensive to manufacture. In addition, it should ideally be suitable for use in a great variety of other applications, such as refrigeration seals, autoclaves, storage lockers, and other sealing applications subjected to extreme temperature differentials.

SUMMARY OF THE INVENTION

Briefly, the present invention meets the above needs and purposes with a flexible diaphragm construction, and a method for the fabrication thereof, which furnish diaphragms particularly well suited for extreme temperature usage. The diaphragms are durable, uncomplicated, versatile, relatively inexpensive to manufacture, and as a result are suitable for use in a great variety of applications in addition to such specialized aerospace applications as those discussed above.

According to the teachings of the present invention, a preferred embodiment of the invention furnishes such diaphragms as an assembly fabricated on a 2% oversize aluminum layup mold which has been suitably formed and shaped according to the intended shape of the diaphragm. The mold is oversize to allow for calendered silicon rubber shrinkage after cure.

In use, the working surface of the layup mold is first cleaned. Then a continuous adhesive coat is sprayed onto the mold working surface, and the adhesive is allowed to develop good tack. Next a first bleeder fabric layer is smoothly applied to the adhesive on the mold working surface, extending beyond the finished diaphragm size. The bleeder fabric is then coated and saturated with a release agent. Then a wrinkle free continuous first layer of calendered uncured high molecular weight consistency silicon rubber sheet material is hand applied to the bleeder fabric. Parting fabric is used to aid in applying the silicone rubber sheet material in order to minimize contact lifting of the uncured rubber while this first layer is applied.

Next, a wrinkle free, splice free, and fold free layer of continuous glass fabric reinforcement is applied onto the first layer of silicone rubber sheet material, extending beyond the silicon rubber sheet edge. The fabric reinforcement is then coated, saturated, or impregnated with an adhesive primer. Then a wrinkle free continuous second layer of calendered uncured high molecular weight consistency silicone rubber sheet material is hand applied to the layer of fabric reinforcement. Using a parting fabric aid to prevent contact lifting, a layer of parting fabric is then applied to the second layer of silicone rubber sheet material, and an external layer of bleeder fabric is applied to the parting fabric. As with the first bleeder fabric layer and the continuous glass fabric reinforcement layer, the external layer of bleeder fabric also extends beyond the edge of the parting fabric and the silicone rubber sheet layers, so that all three such extended layers provide for vacuum removal (as further discussed below) of any entrapped air between the impregnated glass fabric and the two layers of calendered silicon rubber. This provides for a void free composite.

The process is continued by sealing a vacuum bag to the layup mold over this assembly of layers. Then a vacuum is applied between the vacuum bag and the layup mold, and the assembly is cured under heat and augmented autoclave pressure applied externally to the vacuum bag, while the vacuum is maintained between the vacuum bag and the layup mold.

Finally, the assembly is cooled, the vacuum and pressure released, and the finished diaphragm assembly is separated and removed from the first layer of bleeder fabric, the layer of parting fabric, and the external bleeder fabric layer.

The result is a flexible diaphragm suitable for use as a seal in the extreme temperature and environmental conditions and requirements discussed above.

It is therefore an object of the present invention to provide a flexible diaphragm suited for extreme temperature usage, and a method for the fabrication thereof; such a diaphragm and method which can be adapted to the widest range of diaphragm shapes, sizes, and configuration; in which the method commences by first preparing the working surface of a layup mold which is shaped for forming the diaphragm thereon; in which a first bleeder means is then applied to the mold working surface; in which a first layer of silicone rubber sheet material is then applied over the bleeder means; in which a layer of fabric reinforcement is then applied onto the first layer of silicone rubber sheet material; in which the fabric reinforcement is then coated with an adhesive; in which a second layer of silicone rubber sheet material is then applied over the layer of fabric reinforcement; in which a parting means is then applied to the second layer of silicone rubber sheet material; in which a second bleeder means is then applied to the parting fabric; in which a vacuum bag is then sealed to the layup mold over the assembly of layers recited above; in which a vacuum is then applied between the vacuum bag and the layup mold; in which the assembly is then cured under heat and augmented autoclave pressure applied externally to the vacuum bat, while maintaining a vacuum between the vacuum bag and the layup mold; in which the finished diaphragm assembly is then separated and removed from the first bleeder means and the parting means; and to accomplished the above objects and purposes in an uncomplicated, durable, versatile, and reliable method and apparatus, inexpensive to manufacture, and suitable for use in a great variety of other applications having extreme temperature differentials.

These and other objects and advantages of the invention will be apparent from the following description, the accompanying drawings, and the appended claims.

BRIEF DESCRIPTION OF THE DRAWINGS

FIG. 1 is a somewhat figurative and simplified cross-section illustration showing the diaphragm bridging a ring-shaped space between two bulkhead members;

FIG. 2 is an enlarged detail of the FIG. 1 illustration showing the diaphragm in cross-section;

FIG. 3 is a schematic drawing, broken away layer by layer, illustrating the method of fabrication and the structure of the diaphragm.

DESCRIPTION OF THE PREFERRED EMBODIMENT

Figure 4:
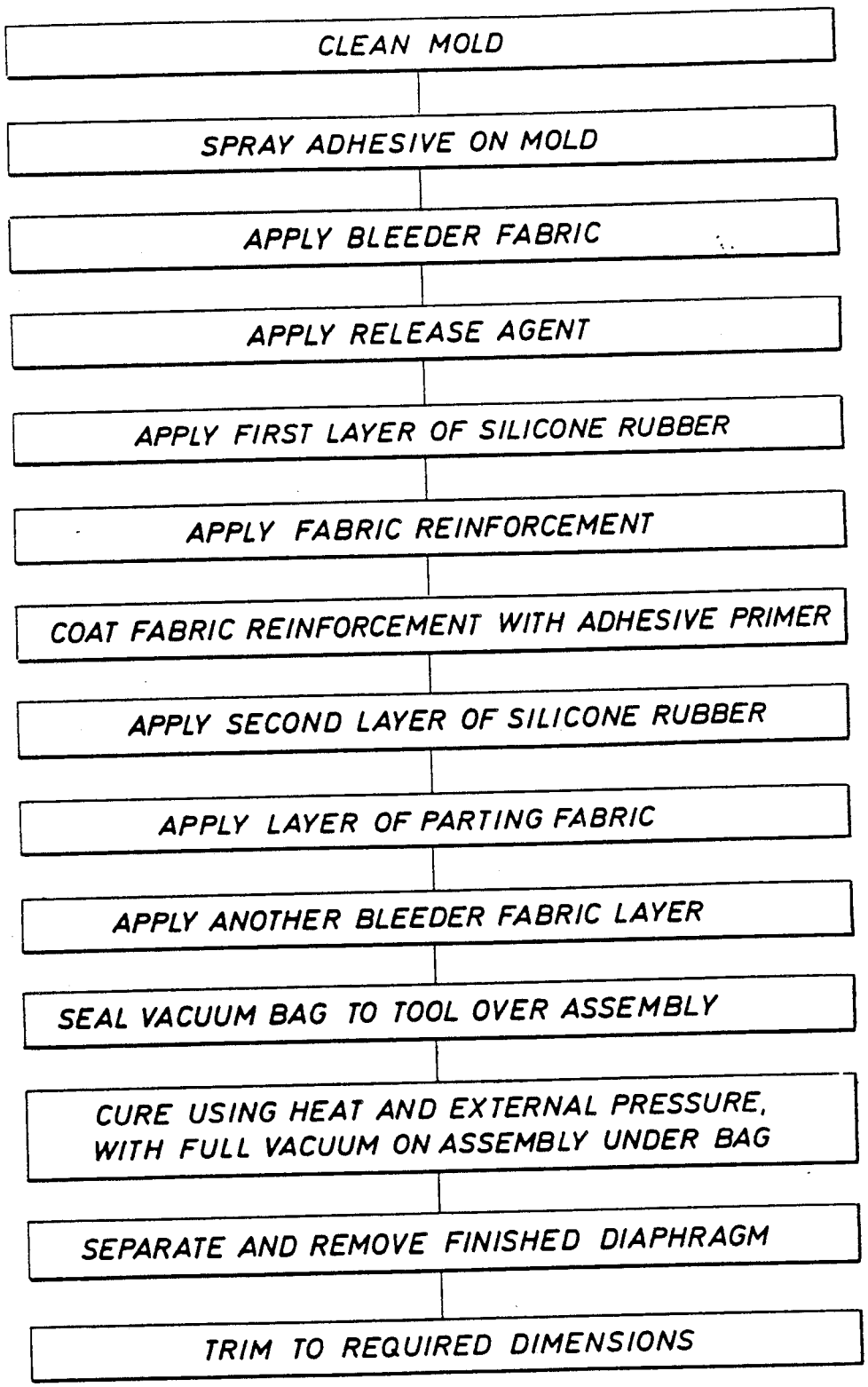
FIG. 4 is a flow diagram showing the sequence of steps in the manufacture of the diaphragm.

With reference to the drawings, the new and improved flexible diaphragm 10 suitable for extreme temperature usage, and the method for the manufacture thereof according to the present invention, will now be described. FIG. 1 shows, in simplified figurative form, a barrier 12, such as a bulkhead, having a ring-shaped gap 15 running therearound. The central portion 12a of the bulkhead 12 is free to move, to some extent, with respect to the outer portion 12b thereof. Thus, for example, the central opening 17 in the bulkhead central portion 12a might have sealed therein an engine assembly, or an umbilical disconnect, etc. The conceivable applications are virtually limitless. Here, however, it is assumed that extreme differences in temperature will be encountered, and particularly conditions which can be extremely cold.

The diaphragm, as shown in greater detail in cross-section in FIG. 2, can meet the extreme conditions described at length earlier herein. It consists of two separate sheets 20a and 20b of high molecular weight consistency silicone rubber placed on each side of a continuously layed up layer 22 of glass fabric, coated, saturated, or impregnated with a thinned adhesive. This sandwich is bonded using a co-cure process in a vacuum/pressure bag in an autoclave. The resultant structure is, in effect, a double seal, with sealing capability down to −180° F. Tests for aerospace applications have shown it capable of multi-mission use in situations where no prior art structure could be found which could meet the required performance capabilities.

With reference now more particularly to FIGS. 3 and 4, the step-wise method for fabricating the diaphragm is as follows. First a male layup mold 26 is prepared in the shape desired for the diaphragm. In the preferred embodiment, mold 26 is made of aluminum and machined 2% oversize to allow for the silicone rubber shrinkage factor.

The layup or working surface 27 of mold 26 is then cleaned, for example with 1,1,1 trichloroethane, and scraped if necessary (with non-metallic scrapers). Then a continuous coat of adhesive is sprayed on the working surface 27, and allowed to develop good tack (e.g., about two to five minutes). A spray adhesive such as that sold under the trademark "SCOTCH" 6082, or the like, may be used.

To allow air to exit from either side of the diaphragm 10 as it is being formed, a first bleeder layer 29, of 181 weave, type 6, glass fabric, available from Burlington Glass Fabric Co., Alta Vista, Va., is applied smoothly (preferably by hand forming) to the adhesive on the mold layup surface 27, with the warp in the long direction of the mold, and extending beyond the diaphragm finished edge. The full fabric surface is then rubbed down with "TEFLON" paddles or rollers to prevent any bridging of the fabric. The adhesive is then allowed to air dry for 30 minutes, minimum. The bleeder fabric is then coated and saturated with a release agent such as a fluorocarbon parting agent (for example "MS 143", available from Miller-Stephenson, Danbury, Conn.).

Next, a continuous first layer or sheet of calendered uncured silicone rubber is applied wrinkle free to the bleeder fabric 29, to form sheet 20a. Good results have been obtained with a 0.030 in. thick calendered, uncured methyl phenyl siloxane polymer sheet, such as "SMC 1050" sold by "D" Aircraft Products Company, 1191 Hawk Circle, Anaheim, Calif. Gloved hands should be used, and during the hand forming of the rubber sheet 20a to the contour of the mold 26, it is helpful to use a piece of "TEFLON" coated parting fabric (such as "TX 1040", available from Richmond Corporation, Redlonde, Calif.) to minimize tacking of the rubber sheet to the gloved hands.

Next, the central glass fabric layer 22 is formed by applying a wrinkle free, splice free, and fold free layer of continuous glass fabric reinforcement onto the first layer 20a of silicone rubber sheet material, maintaining warp direction identity, and extending beyond the edge of the silicon rubber material. The glass fabric 22 is formed to the mold contour and smoothed into intimate contact with the silicone rubber layer 20a using a "TEFLON" paddle or a roller. In the preferred embodiment, glass fabric, 120 weave, Type 8, Finish B, (available from Burlington Glass Fabric Co., Alta Vista, Va.) is used for layer 22.

Following this, an adhesive primer is brushed onto and impregnated into the full surface of the reinforcing fabric layer 22 and allowed to air dry for at least two hours. In the preferred embodiment, a diluted mix of commercially available silicone rubber primer, such as that sold under the trademark "DAPCOTAC" 3300Th, Part A, mixed with "DAPCOTAC" 3300Th, Part B, in the ratio of ten parts by weight of Part A to one part of Part B, and this is mixed with eleven parts by weight of toluene. Outer rubber sheet 20b is then hand applied to the adhesive impregnated fabric reinforcement layer 22. The second layer 20b, like layer 20a, is a continuous sheet of calendered, uncured silicone rubber, applied wrinkle free by hand. The same 0.30 in. Thick "SMC 1050" methyl phenyl siloxane polymer sheet is preferably used in the preferred embodiment.

Next, a layer 33 of parting fabric (such as "TX 1040" "TEFLON" coated fabric) is applied to the second layer 20b of the silicone rubber sheet material. This, in turn, is covered with one additional layer 36 of bleeder fabric, such as the 181 glass fabric used for layer 29, and also extending beyond the edge of the silicon rubber material.

Finally, a vacuum bag 38 is sealed to the layup mold 26 over layers 29, 20a 22, 20b, 33, and 36. Bag 38 may simply be a sheet of suitable nylon bagging film (such as "WRIGHTLON" 7400, sold by International Plastics Products, Inc., Los Angeles, Calif.) The sealant may be a bead of commercially available, compatible sealant, such as "GS43" available from the W. P. Fuller Company, Los Angeles, Calif.

A vacuum is then slowly applied between the vacuum bag 38 and mold 26, and the assembly of layers is cured under heat and pressure applied externally to the vacuum bag 38 (the vacuum between the vacuum bag 38 and the layup mold 26 being maintained). In the preferred embodiment, 26 inches of mercury vacuum is maintained; the externally applied pressure is $75 \pm 10$ PSI; the cure temperature is $345° \pm 10°$ F.; and the cure time is from 60 to 120 minutes.

The assembly is then cooled to less than 150° F. before the vacuum and pressure are released, and the finished diaphragm 10 is separated and removed from the first bleeder fabric layer 29 and the parting fabric layer 33. The diaphragm flanges are then trimmed to the desired finished dimensions.

As may be seen therefore, the present invention provides numerous advantages. Principally, it furnishes a flexible, durable diaphragm structure, and method of fabrication, suitable for the rigorous and extreme temperature conditions found in aerospace applications such as the Shuttle Orbiter. The diaphragm and its method of fabrication are uncomplicated, versatile, and relatively inexpensive to implement. The invention thus lends itself ideally to many other demanding applications and configurations, such as refrigeration seals, autoclaves, storage lockers, and other sealing applications having extreme temperature differentials and long life requirements.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:
1. A flexible diaphragm suitable for extreme temperature usage, comprising a void free assembly fabricated by:
 (a) preparing the working surface of a layup mold shaped for forming the diaphragm thereon,
 (b) applying adhesive to the mold working surface and allowing the adhesive to develop good tack,
 (c) applying a first bleeder means to the adhesive on the mold working surface,

(d) applying a first layer of silicone rubber sheet material over the bleeder means, (e) applying a layer of fabric reinforcement onto the first layer of silicone rubber sheet material, (f) coating the fabric reinforcement with an adhesive, (g) applying a second layer of silicone rubber sheet material over the layer of fabric reinforcement, (h) applying a parting means to the second layer of silicone rubber sheet material, (i) applying a second bleeder means to the parting fabric, (j) sealing a vacuum bag to the layup mold over the assembly of layers recited in the preceding steps (b) through (i), (k) applying a vacuum between the vacuum bag and the layup mold, (l) curing the assembly under heat and pressure applied externally to the vacuum bag, while maintaining a vacuum between the vacuum bag and the layup mold, and (m) separating and removing the finished diaphragm assembly from the first bleeder means and the parting means; wherein said diaphragm remains flexible and usable and maintains its sealing capability in extreme temperature environments of below −150 degrees F, and also remains flexible and usable and maintains its sealing capability in temperature environments of above +500 degrees F, and also remains flexible and usable and maintains its sealing capability in temperature environments at all temperatures between the two extremes.

2. The diaphragm of claim 1 wherein Step (c) further comprises coating the bleeder means with a release agent.

3. The diaphragm of claim 1 wherein steps (d) and (g) further comprise using parting fabric to minimize tacking while applying the layer of silicone rubber sheet material.

4. A flexible diaphragm suitable for extreme temperature usage, comprising a void free assembly fabricated by:

(a) cleaning the working surface of a layup mold shaped for forming said diaphragm thereon, (b) spraying a continuous adhesive coat on the mold working surface and allowing the adhesive to develop good tack, (c) smoothly applying a first bleeder fabric layer to the adhesive on the mold working surface, (d) coating and saturating the bleeder fabric with a release agent, (e) hand applying a wrinkle free continuous first layer of uncured silicone rubber sheet material to the bleeder fabric, (f) using parting fabric to minimize tacking while applying the first layer of silicone rubber sheet material, (g) applying a wrinkle free, splice free, and fold free layer of continuous glass fabric reinforcement onto the first layer of silicone rubber sheet material, (h) coating the fabric reinforcement with an adhesive primer, (i) hand applying a wrinkle free continuous second layer of uncured silicone rubber sheet material to the layer of fabric reinforcement, (j) applying a layer of parting fabric to the second layer of silicone rubber sheet material, (k) applying a layer of bleeder fabric to the parting fabric, (l) sealing a vacuum bag to the layup mold over the assembly of layers recited in the preceding steps (c) through (k), (m) applying a vacuum between the vacuum bag and the layup mold, (n) curing the assembly under heat and pressure applied externally to the vacuum bag, while maintaining a vacuum between the vacuum bag and the layup mold, (o) cooling the assembly, (p) releasing the vacuum and pressure, (q) separating and removing the finished diaphragm assembly from the first layer of bleeder fabric and the layer of parting fabric, and (r) trimming the diaphragm to finished dimensions; wherein said diaphragm remains flexible and usable and maintains its sealing capability in extreme temperature environments of below −150 degrees F., and also remains flexible and usable and maintains its sealing capability in temperature environments of above +500 degrees F., and also remains flexible and usable and maintains its sealing capability in temperature environments at all temperatures between the two extremes.

5. The flexible diaphragm of claim 1 wherein the silicone rubber sheet material of steps d and g are uncured silicone rubber sheet material, and wherein said diaphragm thus produced is a void free, vacuum autoclave pressure cured, silicone rubber molding substantially enclosing a fabric reinforcement.

6. A flexible sealing diaphragm suitable for extreme temperature usage, said diaphragm consisting of a molded, heat and vacuum and pressure cured, void free composite of elastomer and nonelastomer reinforcing material, wherein said elastomer substantially encloses the non-elastomer reinforcing material, and wherein said diaphragm remains flexible and useable and maintains its sealing capability in extreme temperature environments of below −150 degrees F., and also remains flexible and useable and maintains its sealing capability at extreme temperature environments above +500 degrees F., and also remains flexible and useable and maintains its sealing capability at all temperatures between the two extremes.

7. The flexible diaphragm of claim 6 wherein said elastomer is methyl phenyl siloxane and said non-elastomer is glass fabric.

8. The flexible diaphragm of claim 7 wherein said diaphragm is fabricated by:

(a) cleaning the working surface of a layup mold shaped for forming the diaphragm thereon, (b) spraying a continuous adhesive coat on the mold working surface and allowing the adhesive to develop good tack, (c) smoothly applying a first bleeder fabric layer to the adhesive on the mold working surface, (d) coating and saturating the bleeder fabric with a release agent, (e) hand applying a wrinkle free continuous first layer of uncured methyl phenyl siloxane elastomer sheet material to the bleeder fabric, (f) using parting fabric to minimize tacking while applying the layer of elastomer sheet material, (g) applying a wrinkle free, splice free, and fold free layer of continuous glass fabric reinforcement onto the first layer of elastomer sheet material, (h) coating the fabric reinforcement with an adhesive primer, (i) hand applying a wrinkle free continuous second layer of uncured methyl phenyl siloxane elastomer sheet material to the layer of fabric reinforcement, (j) applying a layer of parting fabric to the second layer of elastomer sheet material, (k) applying a layer of bleeder fabric to the parting fabric, the bleeder fabric and glass fabric layers all being of sufficient size and so positioned as to extend beyond the edge of the elastomer sheet material (l) sealing a vacuum bag to the layup mold over the assembly of layers recited in the preceding steps (c) through (k), (m) applying a vacuum between the vacuum bag and the layup mold, (n) curing the assembly under heat and pressure applied externally to the vacuum bag, while maintaining a vacuum between the vacuum bag and the layup mold, thereby removing by vacuum all entrapped air between the glass fabric and the elastomer material, (o) cooling the assembly, (p) releasing the vacuum and pressure and, (q) separating and removing the diaphragm from the first layer of bleeder fabric and the layer of parting fabric.

9. The flexible diaphragm of claim 8 wherein step (k) further comprises curing the diaphragm by maintaining a vacuum of approximately 26 inches of mercury between the vacuum bag and the layup mold, maintaining a pressure applied externally to the vacuum bag of 75 (+or −10) pounds per square inch above atmospheric, and maintaining a temperature of 345 (+ or −10) degrees F. for 60 to 100 minutes, all, at least in part, simultaneously.

10. The flexible diaphragm of claim 4 wherein the flexible diaphragm is a void free, composite and wherein said diaphragm remains flexible and useable and maintains its sealing capability in extreme temperature environments of below −150 degrees F., and also remains flexible and useable and maintains its sealing capability at extreme temperature environments and maintains its sealing capability at all temperatures between the two extremes.

* * * * *